(12) United States Patent
Fite

(10) Patent No.: US 6,761,367 B2
(45) Date of Patent: Jul. 13, 2004

(54) HAMPER ASSEMBLY WITH LAUNDRY SUPPLY STORAGE CONTAINERS

(75) Inventor: David Lee Fite, 1531 NW. 175th Ter., Miami, FL (US) 33169

(73) Assignee: David Lee Fite, Miami, FL (US)

(*) Notice: Subject to any disclaimer, the term of this patent is extended or adjusted under 35 U.S.C. 154(b) by 25 days.

(21) Appl. No.: 10/103,341

(22) Filed: Mar. 21, 2002

(65) Prior Publication Data

US 2003/0178800 A1 Sep. 25, 2003

(51) Int. Cl.[7] .................................................. B65D 1/24
(52) U.S. Cl. ..................... 280/47.26; 220/913; 220/761
(58) Field of Search .................... 280/47.26, 47.315, 280/33.998, 47.131, 47.17, 47.24, 47.34, 47.371; 16/114.1; 220/762, 212.5, 244, 761, 765, 769, 913, 908; D32/37

(56) References Cited

U.S. PATENT DOCUMENTS

| | | | |
|---|---|---|---|
| D256,423 S | | 8/1980 | Backsay |
| 4,714,158 A | * | 12/1987 | Oltman et al. ............... 206/349 |
| 4,981,232 A | * | 1/1991 | Wynn ......................... 220/22.3 |
| 5,118,173 A | | 6/1992 | Proctor |
| D348,127 S | | 6/1994 | Van Berne |
| 5,367,718 A | * | 11/1994 | Ellis ............................... 4/449 |
| 5,407,089 A | * | 4/1995 | Bird et al. ................ 220/212.5 |
| 5,690,217 A | | 11/1997 | Friday |
| D398,108 S | | 9/1998 | Diaz |
| 5,833,336 A | * | 11/1998 | Dean ......................... 312/293.2 |
| 6,036,204 A | * | 3/2000 | Craft et al. ............. 280/47.315 |
| 6,062,416 A | * | 5/2000 | Smillie ........................ 220/524 |
| D431,099 S | | 9/2000 | Douglas |
| 6,145,856 A | * | 11/2000 | Conti ....................... 280/47.26 |
| 6,193,247 B1 | * | 2/2001 | Spear et al. ........... 280/33.998 |
| D440,020 S | * | 4/2001 | Ronson et al. ................ D32/37 |
| 6,390,495 B1 | * | 5/2002 | Cates .......................... 280/652 |

FOREIGN PATENT DOCUMENTS

DE 000464702 A1 * 6/1991 ............. B65F/1/14

* cited by examiner

*Primary Examiner*—Brian L. Johnson
*Assistant Examiner*—J. Allen Shriver
(74) *Attorney, Agent, or Firm*—Ruben Alcoba; Laurence Edson

(57) ABSTRACT

A laundry hamper assembly. A hamper, having a bottom floor and a top portion, features a container disposed in its top portion. The container and the bottom floor define a cavity for storing articles of clothing. The container in the hamper is configured to hold laundry supplies. Ventilation grills are defined in the hamper between the container and the bottom floor, allowing air to flow from the cavity to the outside of the hamper. Other elements improve the mobility of the hamper assembly, and secure the contents of both the hamper and its containers.

18 Claims, 3 Drawing Sheets

HAMPER ASSEMBLY WITH LAUNDRY SUPPLY STORAGE CONTAINERS

BACKGROUND

1. Field of the Invention

The present invention relates to a clothes hamper assembly. More particularly, the present invention relates to a ventilated hamper with containers integrated therein for the storage and transport of laundry supplies.

2. Description of the Related Art

Laundry hampers are generally known in the art, being intended for the convenient collection and storage of soiled laundry.

Laundry hampers have been disclosed in U.S. patents. U.S. Pat. No. 5,833,336, to Dean teaches a compartmentalized hamper. The compartments hold various laundry articles. U.S. Pat. No. 5,690,217, to Friday discloses a hamper with wheels, a handle and a cover. U.S. Pat. No. 5,118,173, to Proctor, et al. discloses a hamper with an externally disposed clothespin tray.

There are also many ornamental designs for hampers. U.S. Pat. No. D256,423 to Bacskay, et al., U.S. Pat. No. D348,127 to Van Berne, U.S. Pat. No. D398,108 to Diaz, and U.S. Pat. No. D431,099 to Douglas are just several examples of design patents pertaining to laundry hampers. The aesthetics of a hamper is a significant consideration for the consumer. Hampers are often placed in conspicuous locations in the home. Hampers might be considered furniture.

Hampers, despite their immediate use for storing and transporting clothing, are ultimately directed to the task of cleaning clothes. However, prior art hampers are woefully inadequate in pursuing that objective. The art cries out for a hamper that stores and transports those laundry supplies that are incidental to, but essential for, the cleaning of clothes.

SUMMARY OF THE INVENTION

This invention generally relates to a laundry hamper assembly. A hamper, having a bottom floor and a top portion, features a container disposed in the top portion of the hamper. The container and the bottom floor of the hamper define a cavity. Articles of clothing are stored in this cavity.

The container in the top portion of the hamper is configured to hold laundry supplies. These supplies include, but are not limited to, detergent, bleach, and fabric softener. The invention further includes a means for supporting the container in the top portion.

Ventilation grills are defined in the sides of the hamper. The grills are between the container and the bottom floor of the hamper. The ventilation grills allow air to flow from the internal cavity to the outside of the hamper. This airflow prevents moisture build-up in the cavity of the hamper. Overtime, moisture might damage articles of clothing.

Other elements of the present invention are featured that improve the mobility of the hamper assembly, and secure the contents of both the hamper and the laundry supply containers.

The hamper assembly of the present invention allows people to place clothes, detergent, fabric softener and bleach in an encompassing container. Thus, providing a person the convenience of transporting and retrieving everything involved in the laundering of clothes at one time. This is an important aspect of this invention, for it allows users of the hamper to launder clothes in an efficient manner.

The present invention eliminates the need to make multiple trips from home to car to remote laundry facilities. An organized hamper is especially important at remote locations, such as a laundry mat. Over time, the present invention will dramatically save time and money.

Accordingly, it is a principle object of the invention to provide a convenient storage system for the containing and transporting the various supplies required to launder clothing.

It is another object of the invention to supply a ventilated storage space for clothing.

It is a further object of the invention to provide for the simultaneous transportation and storage of both laundry articles and laundry supplies in a convenient and efficient manner.

Yet another object of the invention is to ensure that laundry supplies are not forgotten, misplaced, or left behind when the supplies are transported from a storage location to a location for laundering clothing.

BRIEF DESCRIPTION OF THE DRAWINGS

These and other features, aspects, and advantages of the present invention will become better understood with regard to the following description, appended claims, and accompanying and drawings where:

DETAILED DESCRIPTION OF THE PREFERRED EMBODIMENTS

In order to be better understood, a description of the invention is herewith offered, based on a practical application of the above-mentioned drawings.

Figure 1:
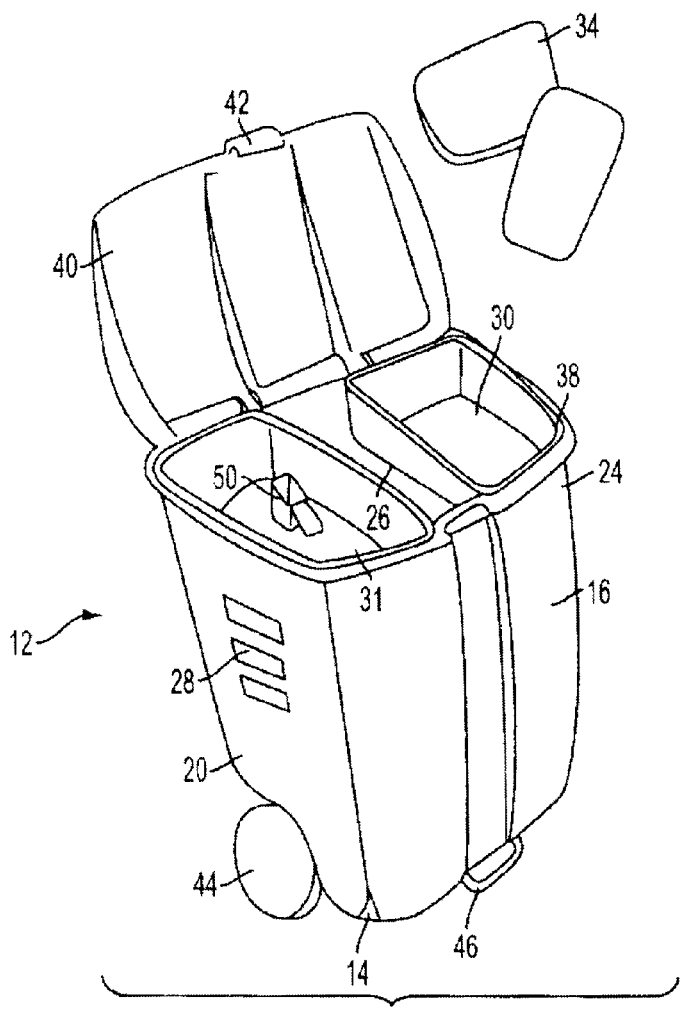
FIG. 1 illustrates a front perspective view of the hamper assembly according to the present invention.

The hamper assembly of the present invention is generally illustrated in FIG. 1. The hamper 12 has a bottom floor 14, front and rear walls 16, 18 and two opposite sidewalls 20, 22. However, the hamper might also be round, or of any other appropriate shape.

The main opening of the hamper 12 is at the top portion 24 of the hamper 12.

Figure 4A:
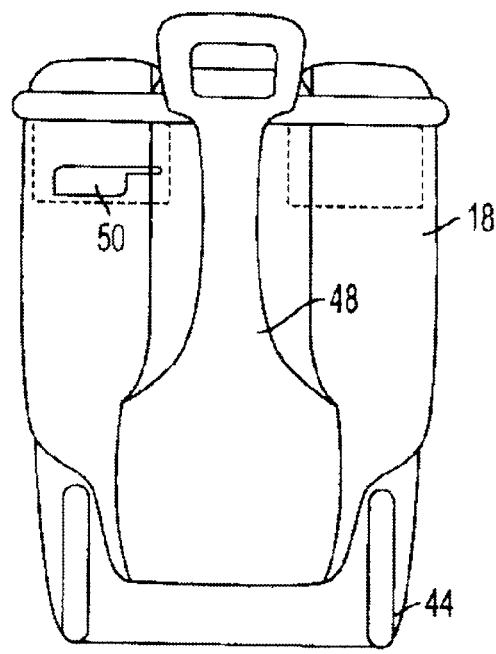
FIGS. 4(a)–(c), respectively, illustrate transparent views from the back, front, and one side of the hamper assembly according to the present invention.
Figure 4B:
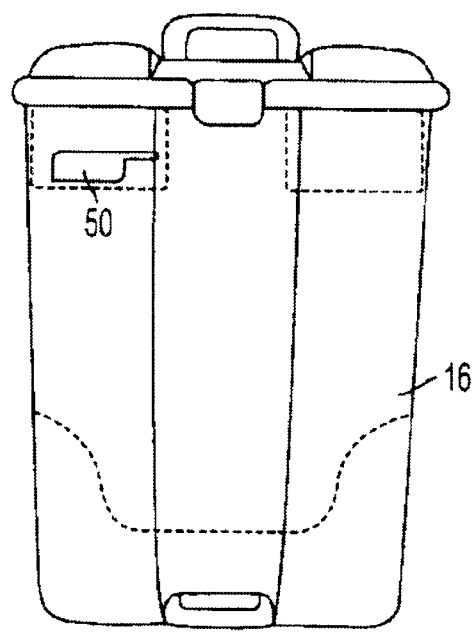
Figure 4C:
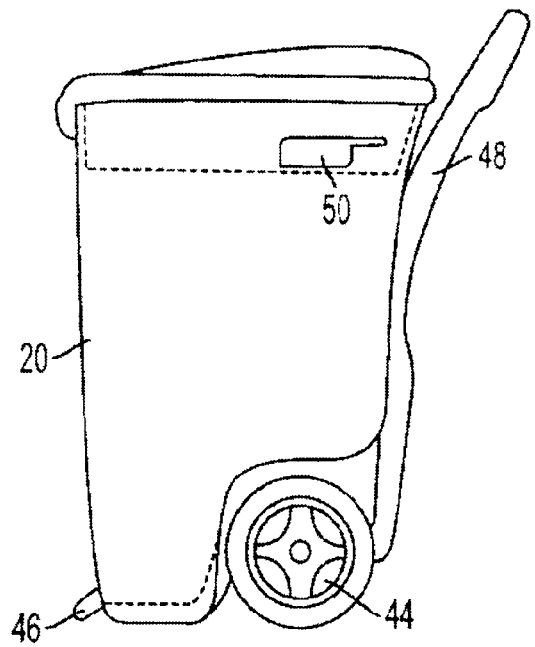

Additionally, in the top portion 24 are a plurality of containers 30, 31. These containers 30, 31 are suspended in the top portion 24 by a means for supporting the container 32. Here, the particular means is a narrowing in the internal circumference of the hamper from the top portion toward the bottom floor. The narrowing persists until the internal circumference of the hamper approximately equals the outer circumference of the containers 30, 31. The means for supporting the container might also be a ledge molded into the sides of the hamper 12. The containers can rest upon this ledge. The containers 30, 31 do not completely block the main opening 26, but leave a space through which clothes might be placed into the hamper 12. The containers 30, 31, the bottom floor 14, front and rear walls 16, 18, and the two opposite sidewalls 20, 22 define a cavity. Clothes are stored and transported in this cavity. The cavity consumes a majority of the space in the hamper 12, as seen in the various views of FIG. 4.

Figure 2:
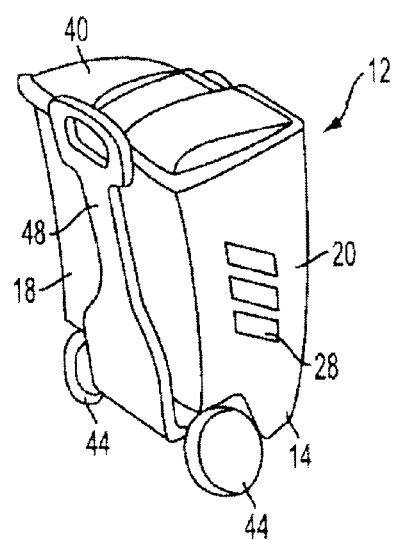
FIG. 2 illustrates a rear perspective view of the hamper assembly according to the present invention.
Figure 3A:
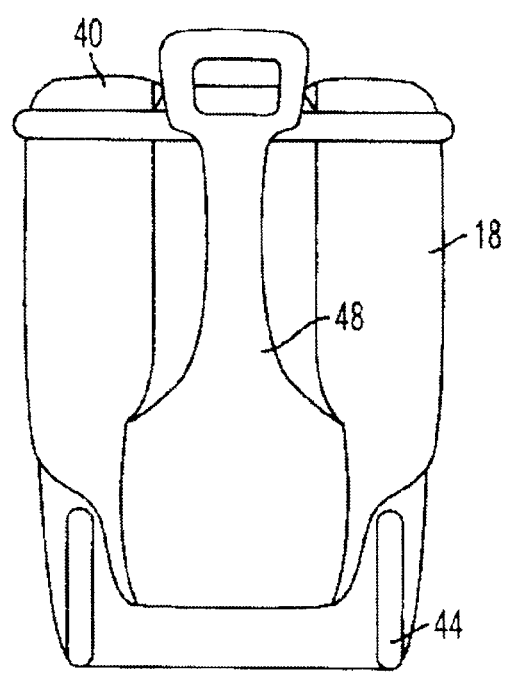
FIGS. 3(a)–(c), respectively, illustrate views from the back, front, and one side of the hamper assembly according to the present invention.
Figure 3B:
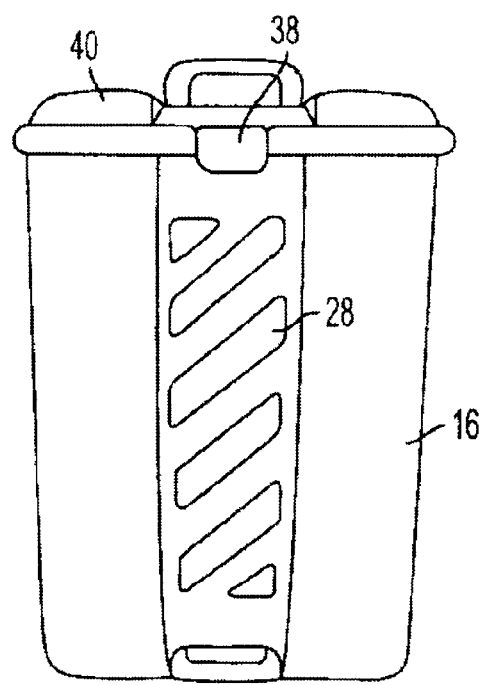
Figure 3C:
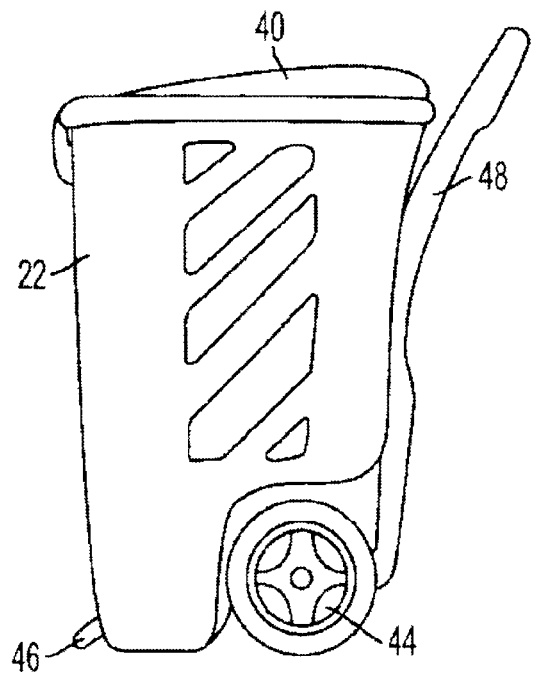

In FIGS. 1 and 2, one sees ventilation grills 28 on the sidewalls 20, 22. However, the ventilation grills 28 might be located anywhere tat would allow air to circulate between die cavity of the hamper 12 and the outside of the hamper 12. In this way the ventilation grills 28 prevent the accumulation of moisture in the cavity. Moisture might damage clothes by encouraging mildew. FIGS. 3 (*b*) and (*c*) show ventilation grills 28 on the front wall 16 and the sidewall 20. Generally, the ventilation grills 28 are optimally sized to facilitate airflow, while preventing articles of clothing from escaping the cavity of the hamper.

The containers 30, 31 have container covers 34, which seal over the open portions of the containers 30,31 with a snap-lock mechanism 38, a variety of snap lock mechanisms are know in the art. The containers 30,31 are principally for storing laundry supplies, such as bleach, detergent, and fabric softener. The containers 30,31 might additionally feature a scoop 50 that is removably attached to either container 30,31.

The hamper 12 has a main-lid 40 that is hingedly attached to the top portion 24 of the hamper 12. In this embodiment, the main-lid 40 is attached at the top portion 24 at the rear wall 18. The main-lid 40 is removably secured to the top portion 24 by a latch 42. Here, the latch 42 is at the top portion 24 at the front wall 16.

FIG. 1 also reveals a set of rubber wheels 44 attached to the bottom floor 14 of the hamper 12. When the hamper 12 is tilted onto the wheels 44, the hamper assembly is easily transported. The wheels 44 might be made of durable rubber. Wheel placement might also be flush with the sidewalls 20, 22. This is clearly illustrated in FIGS. 3(*a*) and 4(*a*).

The hamper assembly, when stationary, is kept upright with the assistance of a stand 46.

FIG. 2, which illustrates a view from the back and side of the hamper assembly, reveals a handle 48 for easy transport. Here, the handle 48 is attached to the bottom floor 14 of the hamper 12 and the handle 48 extends along the rear wall 18 of the hamper 12. This configuration assists a user in tilting the hamper 12 onto the wheels 44.

FIG. 2 further reveals a contoured main-lid 40. In this particular embodiment, the containers 30, 31 extend beyond the top portion 24 of the hamper 12, and the main-lid 40 has a contoured shape to accommodate and abut the containers 30, 31. The theme of contouring might also be continued in the front 16 and sidewalls 20,22 that similarly reflect the shape of the containers 30,31 within.

One embodiment contemplates a hamper 12 approximately 28.5 inches long, 24 inches wide, and 31 inches deep, and at least one container approximately 23.5 inches long, 6 inches wide, and 5 inches deep. These dimensions allow for the storage and transport of an average load of clothes. The entire hamper 12 might be made of durable plastic.

It is to be understood that the present invention is not limited to the embodiments described above, but encompasses any and all embodiments within the scope of the following claims.

I claim:

1. A laundry hamper assembly comprising:
   a hamper having a bottom floor, front and rear walls, two opposite sidewalls, and a top portion having an opening formed there through;
   ventilation grills defined in at least one of the front and rear walls, or the two opposite side walls;
   a means for supporting a container in the top portion of the hamper;
   at least one container held by the means for supporting a container, wherein the bottom portion of the container and the floor of the hamper define a cavity for storing;
   a container cover;
   an open portion of the container for receiving the container cover; and
   a snap-lock mechanism for removably securing the container cover to the open portion of the container.

2. The assembly of claim 1, wherein the means for supporting the container is a narrowing in the internal circumference of the hamper from the top portion toward the bottom floor, the narrowing persisting until the internal circumference of the hamper approximately equals the outer circumference of the container.

3. The assembly of claim 1, further comprising:
   a plurality of containers in the top portion of the hamper.

4. The assembly of claim 1, further comprising:
   a main-lid attached to the top portion of the hamper, the main-lid having a main lid securing means for removably attaching the main-lid to the top portion of the hamper.

5. The assembly of claim 4, wherein the securing means is a latch.

6. The assembly of claim 4, wherein the lid is hingedly attached to the top portion of the hamper.

7. The assembly of claim 4, wherein the container extends beyond the top portion of the hamper, and the main-lid has a contoured shape to accommodate and abut the container.

8. The assembly of claim 1, further comprising:
   wheel means attached to the bottom floor of the hamper, for wheeling the hamper when the hamper is tilted onto the wheel means.

9. The assembly of claim 8, further comprising a stand attached to the bottom portion of the hamper, the stand opposite the wheel means.

10. The assembly of claim 8, wherein the wheel means comprises a set of rubber wheels attached to the bottom portion of the hamper.

11. The assembly of claim 8, further comprising a handle attached to the hamper.

12. The assembly of claim 8, wherein the handle is attached to the bottom floor of the hamper and the handle extends along the rear wall of the hamper, thereby allowing a user to tilt the hamper onto the wheel means.

13. The assembly of claim 1, wherein:
   the hamper is approximately 28.5 inches long, 24 inches wide, and 31 inches deep; and
   the container is approximately 23.5 inches long, 6 inches wide, and 5 inches deep.

14. The assembly of claim 1, further comprising a removably attached measuring scoop attached to the container.

15. The assembly of claim 1, wherein the hamper and container are made of plastic.

16. A laundry hamper assembly comprising:
   a hamper having a bottom floor and a top portion;
   a container disposed in the top portion of the hamper, whereby the container and the bottom floor define a cavity;
   a means for supporting the container, wherein the means for supporting the container is a narrowing in the internal circumference of the hamper from the top portion toward the bottom floor, the narrowing persisting until the internal circumference of the hamper approximately equals the outer circumference of the container; and ventilation grills defined in the hamper, the grills located between the container and the bottom floor, thereby allowing air to flow from the cavity to the outside of the hamper.

17. The assembly of claim 16, further comprising:

a container cover;

an open portion of the container for receiving the container cover; and a snap lock mechanism for removably securing the container cover to the open portion of the container.

18. The assembly of claim 16, wherein the cavity volume is greater than half the volume of the hamper.

* * * * *